United States Patent [19]
Shah et al.

[11] Patent Number: 5,880,223
[45] Date of Patent: Mar. 9, 1999

[54] NON-BLOOMING POLYESTER COATING POWDER

[75] Inventors: Navin B. Shah, Sinking Spring; Edward Nicholl, Reading; Jeno Muthiah, Wer Nersville, all of Pa.

[73] Assignee: Morton International, Inc., Chicago, Ill.

[21] Appl. No.: 995,125

[22] Filed: Dec. 19, 1997

[51] Int. Cl.$^6$ .................................................. C08F 20/00
[52] U.S. Cl. .................. 525/438; 525/533; 525/934; 525/31
[58] Field of Search .................. 525/438, 533, 525/934

[56] References Cited

U.S. PATENT DOCUMENTS

| | | | |
|---|---|---|---|
| 5,187,220 | 2/1993 | Richart et al. | 525/441 |
| 5,397,641 | 3/1995 | Moens et al. | 525/438 |
| 5,411,810 | 5/1995 | Hirakouchi et al. | 525/438 |
| 5,620,801 | 4/1997 | Binns et al. | 525/440 |

FOREIGN PATENT DOCUMENTS

| | | |
|---|---|---|
| 09-087582 | 3/1997 | Japan . |
| 97/16473 | 9/1997 | WIPO . |

OTHER PUBLICATIONS

Journal, "Improved hydrolytic . . . ", CA AN:119:227141, 1993.

*Primary Examiner*—Randy Gulakowski
*Attorney, Agent, or Firm*—Wayne E. Nacker; Charles N. Lovell; Gerald K. White

[57] ABSTRACT

In a coating powder composition comprising A) a polyester resin having carboxyl functionality so as to provide an acid number of between about 15 and about 100, plus B) epoxy curative at a stoichiometric equivalent relative to said polyester resin of between about 0.7 and about 1.3, blooming in the cured coating resulting therefrom is reduced or eliminated by incorporating within the polyester resin A) the monomer 2-butyl, 2-ethyl, 1,3-propane diol (BEPD) at a level to provide between 2 and 25 mole percent of the hydroxyl functionality relative to total hydroxyl functionality of hydroxyl-functional monomers forming the polyester resin.

7 Claims, No Drawings stone# NON-BLOOMING POLYESTER COATING POWDER

The present invention is directed to coating powders in which the resin system is a carboxyl-functional polyester with an epoxy, such as triglycidyl isocyanurate, as a curative, which coating powder is improved so as to prevent blooming in the coating formed therefrom.

BACKGROUND OF THE INVENTION

Coating powders having a resin system of carboxyl-functional polyester and an epoxy curative, such as triglycidyl isocyanurate (TGIC), are known, e.g., as noted in U.S. Pat. No. 5,187,220. Typical of a polyester for use in such a coating would be a polymer based on terephthalic acid (TA), neopentyl glycol (NPG) and some small amount of modifying monomer, such as ethylene glycol (EG), 1,4-butanediol (1,4-BD), 1,6-hexane diol (1,6-HD), isophthalic acid (IPA), phthalic acid (PA), adipic acid (AA), succinic acid (SA), trimethylol propane (TMP), trimellitic anhydride (TMA), etc.

Many prior art epoxy-cured polyester coating powders, particularly those containing polyesters based primarily on NPG and TA, suffer from the undesirable phenomenon called blooming. The blooming effect becomes evident when an object coated with such a coating powder is kept for a sufficient length of time at a temperature above the glass transition temperature ($T_g$), the bloom appearing as a whitish patina on the surface.

It is a primary object of the invention to provide an epoxy-cured polyester coating powder that does not bloom.

SUMMARY OF THE INVENTION

In accordance with the present invention, a coating powder comprises A) a polyester resin having carboxyl functionality so as to provide an acid number of between about 15 and about 100, plus B) epoxy curative, particularly triglycidyl isocyanurate, at a stoichiometric equivalent relative to said polyester resin of between about 0.7 and about 1.3. The polyester resin A) is formed from the monomer 2-butyl, 2-ethyl, 1,3-propane diol (BEPD) at a level so as to provide between about 2 and about 25 mole percent of the hydroxyl functionality relative to total hydroxyl functionality of hydroxyl-functional monomers used to form the polyester resin A). Incorporation of BEPD at these levels reduces or eliminates blooming of the cured coating formed from the coating powder composition.

DETAILED DESCRIPTION OF CERTAIN PREFERRED EMBODIMENTS

The term "phr" used herein is a weight measurement (parts per hundred resin) which relates to the total amount of the resin system comprising the polyester resin A) plus the epoxy curative B) (100 parts total).

Polyesters resins A) useful in the present invention are linear or branched being formed of polyols and polyfunctional carboxylic acids (or monomers having both —OH and —COOH functionality). Carboxylic functionality is provided in excess over hydroxyl functionality, whereby the polyester chains are carboxyl terminated. The polyesters are relatively short chain having acid numbers of between about 15 and about 100, preferably between about 25 and about 90.

Examples of suitable polyols for forming the polyester include 1,2-ethanediol, 1,3-propanediol, 1,4-butanediol, diethylene glycol, 1,6-hexanediol, neopentyl glycol, 1,10-decanediol, 1-4-cyclohexanedimethanol, trimethylolpropane, 2-methyl-1,3-propanediol, hydrogenated bisphenol A (or 2,2-(dicyclohexanol)propane), 2,2,4-trimethyl-1,3-pentanediol, 3-hydroxy-2,2-dimethylpropyl 3-hydroxy-2,2-dimethylpropanoate (CA. Reg. No.=115-20-4), and 1,12-dodecanediol, 2-methyl-2-hydroxymethyl-1,3-propanediol and 2-ethyl-2-hydroxymethyl- 1,3-propanediol. Suitable polycarboxylic acids which may be used include succinic acid, adipic acid, azelaic acid, sebacic acid, 1,12-dodecanedioic acid, terephthalic acid, isophthalic acid, trimesic acid, tetrahydrophthalic acid, hexahydrophthalic acid, 1,4-cyclohexanedicarboxylic acid, trimellitic acid and naphthalene dicarboxylic acid.

In accordance with the invention, between about 2 and about 25 percent preferably between about 3 and about 20 percent of the hydroxyl functionality relative to total hydroxyl functionality of monomers used to form the polyester resin A) is provided by the monomer 2-n-butyl-2-ethyl-1,3-propanediol (BEPD) (CAS No. 115-84-4). It is found that incorporation of this monomer at such levels reduces blooming in the cured coating. While Applicant is not bound by theory, it is believed that the inclusion of BEPD in the polyester substantially reduces or eliminates the formation of low molecular weight cyclic polyester chains. Evidence exists that blooming in polyester, epoxy-cured coating powders is a result of production of such cyclic polyester chains. Cyclic ester polyester chains do not enter into the curing reaction and tend to migrate to the surface or "bloom" from the cured coating. Thus, by reducing the formation of such cyclic polyesters, blooming is reduced or eliminated.

Suitable polyepoxy compounds as curatives B) include heterocyclic polyepoxides such as triglycidylisocyanurate (TGIC); polyepoxides of aromatic polyols such as the diglycidyl ether of bisphenol A; cycloaliphatic polyepoxides; glycidyl esters of aromatic or aliphatic polyacids, such as the diglycidyl ester of hexahydrophthalic acid; low equivalent weight epoxy-functional acrylic resins; polyepoxides of aliphatic polyols such as the diglycidyl ether of 1,4-butanediol; and polyepoxides of amino-alcohols, such as the tri-glycidyl ether-amine of 4-amino phenol. Other aromatic polyols which may be used to prepare glycidyl ethers include such species as bisphenol F, and tetrabromobisphenol A, and the like. Polyepoxides from this category also include low molecular weight polymers derived from the above-named aromatic diols and their diglycidyl ethers. Cycloaliphatic polyepoxides include such compounds as 3',4'-epoxycyclohexylmethyl-3,4-epoxycyclohexyl carboxylate and dicyclopentadiene dioxide and the like.

For coating powders to be used at low temperatures, such as for coating wood or heat-sensitive plastics, it is preferred to use epoxy-functional acrylic resins, such as glycidyl methacrylate copolymer. Epoxy equivalent weights of such polymers should range from about 200 to about 1000, preferably between about 200 and about 600.

Glycidyl esters of aromatic and aliphatic polyacids include glycidyl esters of such polyacids as, for example, terephthalic acid, isophthalic acid, phthalic acid, methylterephthalic acid, trimellitic acid, pyromellitic acid, adipic acid, sebacic acid, succinic acid, maleic acid, fumaric acid, tetrahydrophthalic acid, methyltetrahydrophthalic acid, hexahydrophthalic acid, and methylhexahydrophthalic acid.

The coating powder may be clear, i.e., non-pigment-loaded, or may contain up to 200 wt % (200 phr) (though generally 120 wt % (120 phr) or less) of filler and/or pigment. In addition, the coating powder may contain conventional additives, e.g., antioxidants, light stabilizers, flow modifiers, co-stabilizer, etc., generally at a total level of about 10 phr or less.

Coating powders in accordance with the present invention are formed in a conventional manner. The components of the coating powder are combined and blended for not more than 15 minutes, to blend well. The blended materials are then extruded, typically in the range of 70°–150° C. in a single screw or twin screw extruder, allowed to cool, chipped, ground and screened to obtain a powder of appropriate particle size. Average particle size is typically 20–80 microns. Scalping at 100 mesh is typical to remove coarse particles. There is typically about 10% by weight of particles below 10 microns. The amount of material retained on a 325 mesh is typically between about 30 and 50 wt. %. The powder is then applied in a conventional manner, e.g., electrostatically, to a substrate. For purposes of the invention, electrostatic application of coating powder includes conventional methods, such as corona-discharge methods and tribocharging methods. The substrate is heated at the time of application and/or subsequently so that the coating particles melt, form a continuous film, and cure.

The coatings are applicable to conventional substrates, such as metal, e.g., steel or aluminum, various polymers. In addition, as one aspect of the invention, by addition of a suitable catalyst, the cure temperature of the composition may be 300° F. or below and even 250° F. or below, temperatures consistent with application of the coating powder compositions to wood or wood products. Of course cure is time-dependent as well as temperature dependent; however, a full cure must be achieved within a reasonable time. Thus, for purposes of this invention, a cure time of 30 minutes at the cure temperature to achieve a full cure is considered reasonable, and temperatures of at or below 300° F., preferably at or below 250° F., for 30 minutes to effect a full cure is considered acceptable for wood applications. A "full cure" is a degree of curing achieved at which additional time at elevated temperature will not improve the properties of the coating once cooled to ambient temperatures. Suitable cure catalysts include, but are not limited to ethyltriphenylphosphonium bromide, triphenylphosphine and benzyltrimethylammonium chloride and imidazoles and imiazole adducts, such as epoxy adducts of 2-methyl imidazole. The amount of cure catalyst added to bring the cure temperature down to the temperature required for wood or a wood product will depend upon the particular composition, the catalyst of choice, and the appropriate maximum cure temperature for the particular product. Typically, so as to reduce the cure temperature to that appropriate for wood or wood product, between about 0.1 and about 10.0 wt % cure catalyst will be added based on total weight of A) plus B).

For purposes of this invention wood is defined herein as any lignocellulosic material whether it comes from trees or other plants and whether it be in its natural forms or its fibers have been separated, felted, and compressed to form hardboard, medium density fiberboard, or the like. Particle board, whether standard or treated to enhance its electrical conductivity, and oriented strand board are also within the definition of wood for this invention. Wood having a moisture content of from about 3 to about 10% by weight are most suitable for purpose of this invention.

The invention will now be described in greater detail by way of specific examples.

EXAMPLES 1–9

Polyesters were prepared from the following monomer mixtures with the amounts expressed in equivalents (—OH or —COOH) of unreacted monomer. Monomers listed as G and H are both IPA, but are added in two-stages; thus, their separate listing.

| (Polymer #) | 1 | 2 | 3 | 4 | 5 | 6 | 7 | 8 | 9 |
|---|---|---|---|---|---|---|---|---|---|
| A. NPG | 14.19 | 16.45 | 16.45 | 17.45 | 16.95 | 18.45 | 15.1 | 14.45 | 15.45 |
| B. BEPD | 0.5 | 2.0 | 2.0 | 1.0 | 1.5 | — | 3.0 | 4.0 | 3.0 |
| C. TMP | — | 0.15 | 0.15 | 0.15 | 0.15 | 0.15 | 0.5 | 0.15 | 0.15 |
| D. EG | 0.5 | — | — | — | — | — | — | — | — |
| E. TA | 11.4 | 14.6 | 16.6 | 13.6 | 13.6 | 13.6 | 16.6 | 16.6 | 16.6 |
| F. AA | 0.35 | 0.4 | 0.4 | 0.4 | 0.4 | 0.4 | 0.4 | 0.4 | 0.4 |
| G. IPA | 3.0 | 2.0 | — | 3.0 | 3.0 | 3.0 | — | — | — |
| H. IPA | 2.15 | 3.0 | 3.0 | 3.0 | 3.0 | 3.0 | 3.0 | 3.0 | 3.0 |

The polyesters were synthesized by melt fusion in which monomers A.–G. were mixed in a resin kettle in the presence of esterification catalyst and color stabilizer under nitrogen. The temperature was slowly raised to 240° C. while the water of esterification was collected. When water collection became immeasurable and the acid value (AN) fell below 5, the first stage of synthesis was complete, providing an —OH—terminated polyester. Then, in a second stage, monomer H (remaining IPA) was added to the reaction mixture and heating continued. Finally, heating was continued under a reduced pressure of less than 150 mm Hg until a steady AN was obtained, the AN indicating a carboxyl-terminated polyester. Acid numbers and viscosities ICI@200° C. in cps (VS) for the two stages are given below:

| | (polymer #) | | | | | | | | |
|---|---|---|---|---|---|---|---|---|---|
| | 1 | 2 | 3 | 4 | 5 | 6 | 7 | 8 | 9 |
| AN(1st) | 2.8 | 3.35 | 2.24 | 3.35 | 2.8 | 3.07 | 3.07 | 1.4 | 2.4 |
| VS(1st) | 845 | 700 | 950 | 550 | 700 | 795 | 975 | 1050 | 1025 |
| AN(2nd) | 33.5 | 33.7 | 33.84 | 31.84 | 33.53 | 34.01 | 32.5 | 34.05 | 34.1 |
| VS(2nd) | 2250 | 2500 | 2800 | 2750 | 2500 | 2800 | 4100 | 2875 | 3250 |

For resin evaluation, a black high DOI formulation was prepared containing 93 phr of the polyester, 7 phr TGIC.1.4 phr Resiflow® P-67 (flow-control agent), 0.8 phr Uraflow® B (flow-control agent) and 2.0 phr Raven® 22 Black (pigment). The coating powders were applied to steel panels on which they were fused and cured for ten minutes at 375° F. (191° C.). The coated panels were subjected to a blooming test in which the test panels were put in an air circulation electric oven at 225° F. (107° C.) for varying periods of time, and their gloss determined initially and after exposure.

For comparison, polyester coating powders using commercial polyester resins Morkote® 300(A) and Grilesta® V V73-94 (B) were also tested. Separate panels were prepared for each polyester and time period. The values represent Gloss 20°/60°.

|    | Initial | 4 hours | Initial | 8 hours | Initial | 12 hours | Initial | 16 hrs. |
|----|---------|---------|---------|---------|---------|----------|---------|---------|
| A. | 74/96   | 57/85   | 73/95   | 61/86   | 72/96   | 59/85    | 66/95   | 57/85   |
| B. | 91/97   | 86/91   | 91/97   | 87/90   | 88/97   | 84/91    | 92/97   | 82/88   |
| 1. | 58/91   | 49/81   | 60/92   | 50/83   | 56/91   | 43/77    | 60/92   | 47/81   |
| 2. | 83/97   | 77/96   | 82/96   | 79/95   | 83/97   | 80/96    | 81/96   | 76/95   |
| 3. | 78/96   | 70/93   | 79/96   | 71/92   | 77/96   | 69/92    | 79/95   | 67/91   |
| 4. | 74/96   | 64/92   | 76/96   | 68/93   | 74/96   | 67/93    | 75/96   | 68/92   |
| 5. | 88/96   | 84/96   | 87/97   | 86/97   | 88/98   | 87/97    | 90/97   | 86/96   |
| 6. | 85/97   | 78/90   | 86/96   | 86/93   | 90/97   | 88/94    | 86/97   | 82/91   |
| 7. | 77/97   | 74/95   | 79/96   | 76/95   | 79/97   | 74/95    | 79/86   | 68/93   |
| 8. | 87/97   | 85/96   | 87/97   | 87/97   | 88/97   | 89/98    | 87/96   | 83/97   |
| 9. | 85/97   | 80/96   | 84/97   | 79/96   | 83/97   | 80/97    | 83/96   | 76/95   |

Blooming reduces gloss, thus a minimal reduction in gloss indicates a minimal amount of lack of blooming. As evidenced by the above results, incorporation of BEPD in the polyester reduces blooming in the coating.

EXAMPLE 10 AND 11

Using the polyester of Example 9 above, coating powders #10 and #11 for providing a textured coating on wood was formulated as follows (amounts in parts by weight):

| Polyester | 86 |
|---|---|
| Glycidyl methacrylate copolymer[1] | 14 |
| Flow additive | 2.2 |
| Carbon Black | 2.0 |
| Texturizing agent (fluorocarbon polymer) | 5.0 |
| Filler | 55 |
| Wax | 1.0 |
| P 101 catalyst[2] (Powder #11 only) | 1.0 |

[1]GMA 252 available from Estron Chemical Co.
[2]An epoxy adduct of imidazole

The coating powder compositions were prepared in the manner of the coating powders of Example 1–9.

The powder was applied using electrostatic spray guns on medium density fiberboard that was preheated in an oven set at 350° F. for five minutes so as to raise the temperature of the fiberboard to 200° F. The temperature was maintained at 350° F. for 15 minutes, during which the coating powder fused and cured, the temperature of the fiberboard reaching a maximum of 300° F. The performance of the powders and the coating on the fiberboard substrate are given below:

| Property | Example 10 | Example 11 |
|---|---|---|
| Geltime @ 400° F. | 15 | 11 |
| Hot plate melt flow (HPMF) mm | 15 | 12 |
| Cross hatch Adhesion[3] | 5b | 5b |
| Methylethylketone (MEK) resistance[3] | Moderate rub off | Moderate rub off |
| 60 degree gloss[3] | 2.5 | 1.7 |

[3]properties on ½" thick medium density fiberboard

What is claimed is:

1. A coating powder in the form of a powdered composition comprising A) a polyester resin having carboxyl functionality so as to provide an acid number of between about 15 and about 100, plus B) epoxy curative at a stoichiometric equivalent relative to said polyester resin of between about 0.7 and about 1.3, the improvement wherein the polyester resin A) is formed from the monomer 2-butyl-2-ethyl-1,3-propane diol at a level so as to provide between about 2 and about 25 mole percent of the hydroxyl functionality relative to the total hydroxyl functionality of the hydroxyl-functional monomers forming said polyester resin A), incorporation of said 2-butyl, 2-ethyl, 1,3-propane diol reducing or eliminating blooming of the cured coating formed from the coating powder composition when said cured coating is exposed to a temperature of 225° F. (107° C.) for a period of 12 hours.

2. The coating powder in accordance with claim 1 wherein said epoxy curative is triglycidyl isocyanurate.

3. The coating powder in accordance with claim 1 wherein the acid number of said polyester is between about 25 and about 90.

4. The coating powder in accordance with claim 1 wherein 2-butyl-2-ethyl-1,3-propane diol is at a level so as to provide between about 3 and about 20 mole percent of the hydroxyl functionality relative to the total hydroxyl functionality of the hydroxyl-functional monomers forming said polyester resin A).

5. The coating powder in accordance with claim 1 wherein said curative is an epoxy-functional acrylic polymer.

6. The coating powder in accordance with claim 5 wherein said epoxy-functional acrylic polymer has an epoxy equivalent weight of between about 200 and about 1000.

7. The coating powder in accordance with claim 5 wherein said epoxy-functional acrylic polymer has an epoxy equivalent weight of between about 200 and about 600.

* * * * *